(12) United States Patent
Kim et al.

(10) Patent No.: US 10,911,903 B1
(45) Date of Patent: Feb. 2, 2021

(54) SYSTEMS AND METHODS FOR MULTI-POINT ARRIVAL ANALYSIS

(71) Applicant: COUPANG, CORP., Seoul (KR)

(72) Inventors: Tae Kyung Kim, Seoul (KR); Chee Hyung Yoon, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/776,119

(22) Filed: Jan. 29, 2020

(51) Int. Cl.
| | | |
|---|---|---|
| H04W 4/00 | (2018.01) | |
| H04W 4/029 | (2018.01) | |
| G01S 5/14 | (2006.01) | |
| H04W 4/02 | (2018.01) | |
| G01S 5/02 | (2010.01) | |

(52) U.S. Cl.
CPC ............ H04W 4/029 (2018.02); G01S 5/021 (2013.01); G01S 5/0252 (2013.01); G01S 5/14 (2013.01); H04W 4/023 (2013.01)

(58) Field of Classification Search
CPC ......... G06Q 30/00; G06Q 50/12; G06Q 10/08
USPC ...................................................... 705/15, 28
See application file for complete search history.

(56) References Cited

U.S. PATENT DOCUMENTS

| | | | | |
|---|---|---|---|---|
| 9,172,738 | B1 * | 10/2015 | daCosta ................. | H04L 67/00 |
| 9,928,540 | B1 * | 3/2018 | Gerard ............... | G06Q 30/0635 |
| 10,467,579 | B1 * | 11/2019 | Reiss ................. | G06Q 10/0833 |
| 2004/0073449 | A1 * | 4/2004 | Yang ..................... | G06Q 10/08 |
| | | | | 705/330 |
| 2004/0226775 | A1 * | 11/2004 | Takatama ............... | G06Q 30/06 |
| | | | | 186/53 |
| 2006/0010037 | A1 * | 1/2006 | Angert ................. | G06Q 10/087 |
| | | | | 705/15 |
| 2007/0150375 | A1 * | 6/2007 | Yang ...................... | G06Q 30/06 |
| | | | | 705/339 |
| 2008/0082424 | A1 * | 4/2008 | Walton ................. | G06Q 10/047 |
| | | | | 705/26.1 |
| 2009/0048890 | A1 * | 2/2009 | Burgh .................... | G06Q 10/04 |
| | | | | 705/7.15 |

(Continued)

FOREIGN PATENT DOCUMENTS

KR 20180042598 A 4/2018

OTHER PUBLICATIONS

Notice of Preliminary Rejection dated Aug. 25, 2020 from the Korean Intellectual Property Office for Korean Application No. 10-2020-0016435, with translation (14 pp.).

*Primary Examiner* — Oluseye Iwarere
(74) *Attorney, Agent, or Firm* — Finnegan, Henderson, Farabow, Garrett & Dunner, LLP

(57) ABSTRACT

Disclosed are systems and methods for multi-point destination arrival time analysis. In one aspect, the system may include a memory storing instructions and at least one processor configured to execute the instructions to. The processor performs operations including receiving a request for an order, receiving an acceptance of an order associated with the first external system, determining, upon receiving the acceptance, a first arrival estimate, determining, upon assigning a delivery worker to fulfill the order, a second arrival estimate, and determining, upon receiving confirmation that the delivery worker has retrieved the order from the merchant, a third arrival estimate. Additionally, the operations may include and forwarding, upon their determination, the first, second, and third arrival estimates to the customer.

20 Claims, 7 Drawing Sheets

(56) References Cited

U.S. PATENT DOCUMENTS

| | | | |
|---|---|---|---|
| 2013/0226651 A1* | 8/2013 | Napper | G06Q 20/12 705/7.26 |
| 2014/0136348 A1* | 5/2014 | Carroll | G06Q 30/0635 705/15 |
| 2014/0370167 A1* | 12/2014 | Garden | G08G 1/205 426/233 |
| 2015/0227888 A1* | 8/2015 | Levanon | G06Q 10/0834 705/334 |
| 2016/0171439 A1* | 6/2016 | Ladden | G06F 3/0481 705/340 |
| 2016/0171591 A1* | 6/2016 | Williams | G06Q 30/0635 705/26.81 |
| 2016/0244311 A1* | 8/2016 | Burks | G06Q 50/12 |
| 2016/0275470 A1* | 9/2016 | Straw | G06Q 30/06 |
| 2016/0292664 A1* | 10/2016 | Gilfoyle | G06Q 10/08 |
| 2016/0350837 A1* | 12/2016 | Williams | G06Q 30/0633 |
| 2017/0083991 A1* | 3/2017 | Ghosh | G06Q 50/12 |
| 2017/0124511 A1* | 5/2017 | Mueller | G06Q 10/0837 |
| 2017/0124670 A1* | 5/2017 | Becker | G06Q 50/10 |
| 2017/0290345 A1* | 10/2017 | Garden | A21B 7/00 |
| 2018/0025445 A1* | 1/2018 | Becker | G06Q 50/12 705/15 |
| 2018/0158153 A1* | 6/2018 | Ekin | G06Q 50/12 |
| 2018/0322431 A1* | 11/2018 | Folck | G06Q 10/06316 |
| 2019/0012625 A1* | 1/2019 | Lawrenson | G06Q 50/12 |
| 2019/0050952 A1* | 2/2019 | Goldberg | G06Q 30/0635 |
| 2019/0057347 A1* | 2/2019 | Vitek | G06Q 20/20 |
| 2019/0090679 A1* | 3/2019 | Peng | A47J 27/12 |
| 2019/0114583 A1* | 4/2019 | Ripert | G06Q 10/0833 |
| 2019/0130260 A1* | 5/2019 | Han | G06N 3/0454 |
| 2019/0130354 A1* | 5/2019 | Han | G06Q 10/08355 |
| 2019/0164126 A1* | 5/2019 | Chopra | G06N 3/084 |
| 2019/0266557 A1* | 8/2019 | Berk | G06Q 50/12 |
| 2019/0272571 A1* | 9/2019 | Kim | G06Q 30/06 |
| 2019/0342718 A1* | 11/2019 | Pylappan | H04W 4/021 |
| 2019/0378202 A1* | 12/2019 | Belke | G06Q 50/28 |
| 2020/0065734 A1* | 2/2020 | Szybalski | G06Q 10/06315 |
| 2020/0070717 A1* | 3/2020 | Garden | G01C 21/343 |
| 2020/0097890 A1* | 3/2020 | Migita | G06Q 50/28 |
| 2020/0104904 A1* | 4/2020 | Napper | G06Q 30/0635 |

\* cited by examiner

700

Determine a location of the third external system based on signals transmitted by the third external system 701

Determine that the third external system will arrive at the location associated with the second external system before the determined preparation time has elapsed 702

Delay assignment of the order to the third external system 703

Assign the order to the third external system at the conclusion of the delay period 704

FIG. 7

SYSTEMS AND METHODS FOR MULTI-POINT ARRIVAL ANALYSIS

TECHNICAL FIELD

Embodiments of the present disclosure relate to systems and methods for multi-point arrival analysis. More particularly, embodiments of the present disclosure relate to enabling delivery systems to provide their customers with accurate estimated times of arrival for their delivery that is updated throughout the delivery process in real time.

BACKGROUND

Users (e.g., online customers, online merchants, delivery personnel) often use online website portal or mobile applications to order items (e.g. ordering food or groceries). These delivery systems usually involve a complex network of systems and devices, including servers associated with the delivery systems, customer devices, merchant devices, and delivery devices. These delivery services are often associated with a third-party service provider that coordinate with delivery workers that may be independent or associated with the third-party service providers. Through these systems, a customer can order items delivered from merchants that do not employ delivery workers and would otherwise be unable to deliver their products to their customers.

Generally, customers may utilize these third-party service providers through a website or mobile applications that allow the customer to select items for delivery from a variety of merchants that partner with the service provider. Once the order is placed, the delivery system will often calculate an estimated time of arrival (ETA) of the ordered items at the customer's location and will provide the ETA to the customer through the website or mobile application. However, these ETA estimations rely on a multitude of other time estimates associated with the delivery of the items, such as the preparation time of the item, the travel time between a delivery worker and the merchant at the time of the order, the travel time between merchant and the customer, and more. Each of these are estimated with a large degree of uncertainty, as many of these durations depend on factors that may vary during the delivery process.

In one example, a delivery worker may not yet be assigned to fulfill an order at the time the order is placed, and thus the travel time between the unknown delivery worker and the merchant location may be estimated with a large degree of uncertainty. Additionally, the actual preparation time of the items may be much different than the estimated preparation time when the order is placed. Over the course of delivery, these variables may result in an actual delivery time that is much different than the ETA provided at the time of delivery, causing inconvenience to the customer. Therefore, improved systems and methods for analyzing and providing an ETA during at multiple points (e.g., at delivery worker assignment and at retrieval of the items from the merchant), which would apprise the customer of ETA changes as they occur, are desired.

SUMMARY

One aspect of the present disclosure is directed to a computer-implemented system for multi-point destination arrival time analysis. The system may include: a memory storing instructions; and at least one processor configured to execute the instructions to: receive, from a first external system via a network, a request for at least one orderable item, and store a timestamp in a data store; receive, from a second external system via the network, an acceptance of an order associated with the first external system, the order comprising at least one item; determine a first arrival estimate based on a first estimated travel time between locations associated with the first external system and the second external system, and one of: a determined preparation time for the at least one item, or a second estimated travel time between locations associated with the second external system and a plurality of third external systems; determine a second arrival estimate based on the first estimated travel time, and one of: the determined preparation time for the at least one item, or a third estimated travel time between locations associated with the second external system and an assigned third external system; determine a third arrival estimate based on the first estimated travel time; and forward, upon their determination, the first, second, and third arrival estimates to the first external system.

Another aspect of the present disclosure is directed to a computer-implemented method for multi-point destination arrival time analysis. The method may include: receiving, from a first external system via a network, a request for at least one orderable item, and store a timestamp in a data store; receiving, from a second external system via the network, an acceptance of an order associated with the first external system, the order comprising at least one item; determining a first arrival estimate based on a first estimated travel time between locations associated with the first external system and the second external system, and one of: a determined preparation time for the at least one item, or a second estimated travel time between locations associated with the second external system and a plurality of third external systems; determining a second arrival estimate based on the first estimated travel time, and one of: the determined preparation time for the at least one item, or a third estimated travel time between locations associated with the second external system and an assigned third external system; determining a third arrival estimate based on the first estimated travel time; and forwarding, upon their determination, the first, second, and third arrival estimates to the first external system.

Yet another aspect of the present disclosure is directed to a computer-implemented system for multi-point destination arrival time analysis. The system may include: a memory storing instructions; and at least one processor configured to execute the instructions to: receive, from a customer device for requesting delivery via a network, a request for at least one orderable item, and store a timestamp in a data store; receive, from a merchant device via the network, an acceptance of an order associated with the customer device, the order comprising at least one item, and in response thereto; determine a first arrival estimate based on a first estimated travel time between locations associated with the customer device and the merchant device, and one of: a determined preparation time for the at least one item, or a second estimated travel time between locations associated with the merchant device and a plurality of delivery devices for use by delivery workers; and forward the first arrival estimate to the customer device; receive, from an assigned delivery device, an acceptance to fulfill the order, and in response thereto; determine a second arrival estimate based on the first estimated travel time, and one of: the determined preparation time for the at least one item, or a third estimated travel time between locations associated with the merchant device and an assigned delivery device; and forward the second arrival estimate to the customer device; receive, from a merchant device or an assigned delivery device, confirmation that the order has been retrieved, and in response thereto; determine a third arrival estimate based on the first estimated travel time; and forward the third arrival estimate to the customer device.

BRIEF DESCRIPTION OF DRAWINGS

The accompanying drawings, which are incorporated in and constitute a part of his specification, illustrate disclosed embodiments and, together with the description, serve to explain the disclosed embodiments. In the drawings:

FIG. 7 is a flowchart of another exemplary computerized process for assigning a delivery worker to a specific order, consistent with disclosed embodiments.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

While the following description is directed to providing customers with accurate estimated times of arrival throughout the delivery process in real time, these embodiments are made by example only. It should be appreciated that the present disclosure is not limited to the specific disclosed embodiments and details, which are exemplary only. It is further understood that one possessing ordinary skill in the art, in light of known systems and methods, would appreciate the use of the embodiments of the present disclosure for their intended purposes and benefits in any number of alternative embodiments, depending on specific design and other needs.

Figure 1:
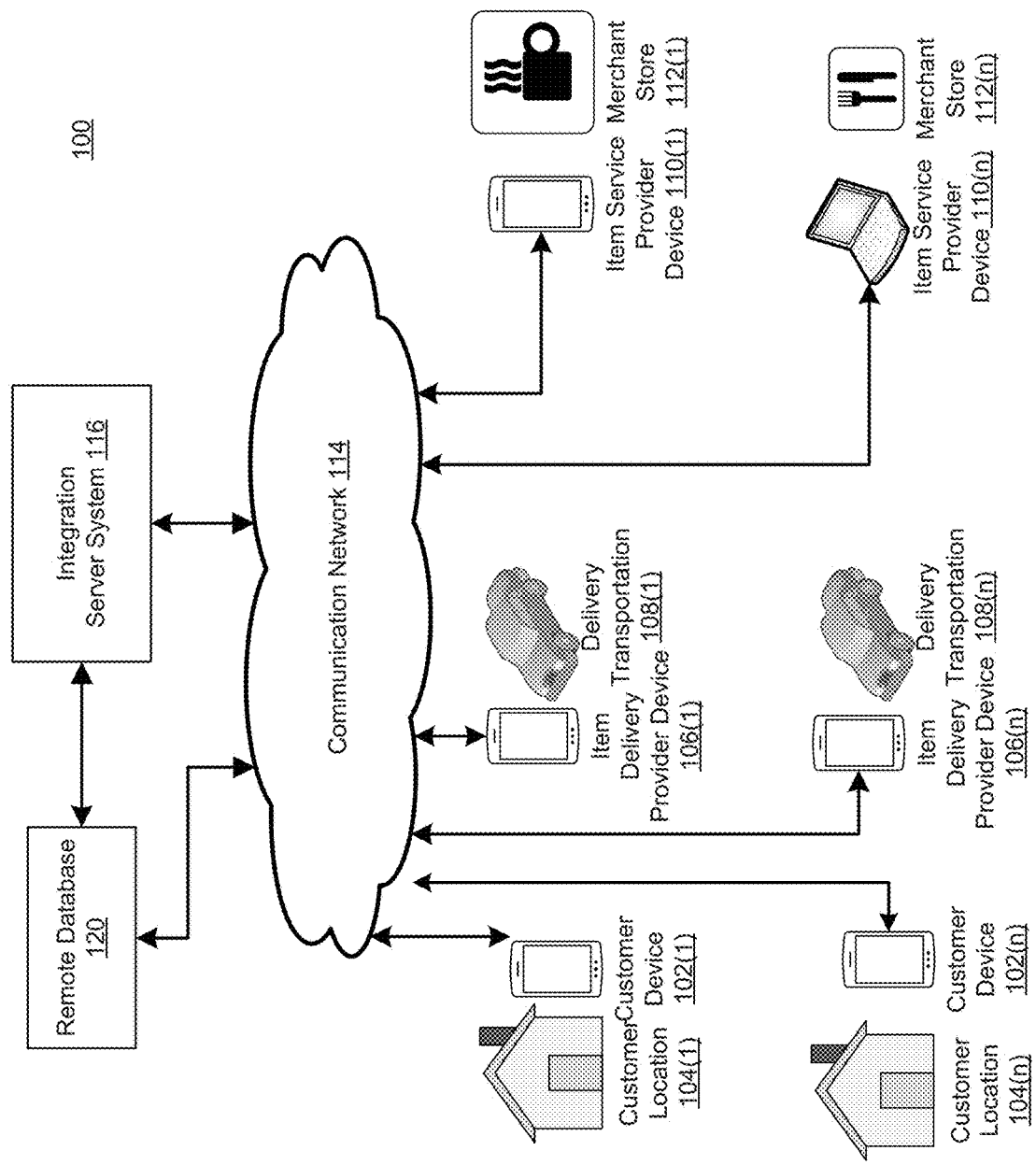
FIG. 1 is a block diagram of an exemplary system, consistent with disclosed embodiments.

FIG. 1 is a block diagram of an exemplary system 100, for performing one or more operations consistent with disclosed embodiments. In some embodiments, system 100 includes one or more customer devices 102(1), . . . 102(n) located at corresponding customer location 104(1), . . . 104(n) respectively, one or more item delivery provider devices 106(1), 106(n) located in corresponding delivery transportations 108(1), . . . 108(n) (e.g., cars, bikes, motorcycles) respectively, one or more item service provider devices 110(1), . . . 110(n) located at corresponding merchant stores 112(1), . . . 112(n). Further, system 100 includes an integration server system 116, a remote database 120 and a communication network 114. The system 100 may also include a plurality of integration server system 116 and a plurality of remote databases 120 communicating with each other directly and further communicating with the customer devices 102(1)-102(n), item delivery provider devices 106 (1)-106(n), item service provider devices 110(1)-110(n) via the communication network 114. The components and arrangement of the components included in system 100 may vary. Thus, system 100 may include other components that perform or assist in the performance of one or more operations consistent with the disclosed embodiments.

As more fully described below, customer devices 102(1)-102(n), item delivery provider devices 106(1)-106(n), item service provider devices 110(1)-110(n), integration server system 116, and remote database 120 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored in the memory to perform one or more operations consistent with the disclosed embodiments. Aspects of customer device(s) 102(1)-102(n), item delivery provider device(s) 106(1)-106(n), item service provider devices 110(1)-110(n), integration server system 116 and remote database 120 may be configured to communicate with one or more other components of system 100 via communication network 114, for example. In certain aspects, customers associated with the customer location 104(1)-104(n) are respectively associated with and operate customer devices 102(1)-102(n), drivers associated with the delivery transportations 108(1)-108(n) are respectively associated with and operate item delivery provider devices 106(1)-106(n), merchants associated with the merchant stores 112(1)-112(n) are respectively associated with and operate item service provider devices 110(1)-110(n), to interact with one or more components of system 100 by sending and receiving communications, initiating operations, and/or providing input for one or more operations consistent with the disclosed embodiments.

Integration server system 116 may be associated with an online ordering entity that receives, processes, manages, or otherwise offers ordering services for items. For example, the items that may be ordered via the online ordering entity may include, prepared food, groceries, furniture, books, computers, and/or clothes, although any other type of items may also be ordered. For example, the integration server system 116 may receive order requests from customers using customer devices 102(1)-102(n) and process the received order request by transmitting the request to item service provider devices 110(1)-110(n) associated with merchant stores 112(1)-112(n) that would provide the ordered item. Integration server system 116 receives an order confirmation communication from item service provider devices 110(1)-110(n). Upon receiving the order confirmation from the item service provider devices 110(1)-110(n), integration server system 116 transmits a request to item delivery provider devices 106(1)-106(n), to collect the order from the merchant stores 112(1)-112(n) and deliver the order to customer location 104(1)-104(n). Item delivery provider devices 106 (1)-106(n) accepts the requests and collects the requested item and delivers it to the customer location 104(1)-104(n).

Remote database 120 of system 100 may be communicatively coupled to integration service system 116 directly or via communication network 114. Further, the remote database 120 of system 100 may be communicatively coupled to customer devices 102(1)-102(n), item delivery provider devices 106(1)-106(n) and item service provider devices 110(1)-110(n) via the communication network 114. Remote database 120 may include one or more memory devices that store information and are accessed and/or managed by one or more components of system 100. By way of example, remote database 120 may include Oracle™ databases, Sybase™ databases, or other relational databases or nonrelational databases, such as Hadoop sequence files, HBase, or Cassandra. Remote database 120 may include computing components (e.g., database management system, database server, etc.) configured to receive and process requests for data stored in memory devices of remote database 120 and to provide data from remote database 120.

Remote database 120 is configured to store, among another things, merchant profile information for merchants associated with the item service provider devices 110(1)-110(n) located at the merchant stores 112(1)-112(n), customer profile information for customers associated with the customer devices 102(1)-102(n) located at the customer locations 104(1)-104(n) and driver profile information for the drivers associated with the item delivery provider devices 106(1)-106(n). Remote database 120, in some embodiments, stores data entries that include, for example, merchant profile information, customer profile information, and driver profile information.

The merchant stores 112(1)-112(n) may include a restaurant, coffee shop, bookstore, clothing stores, although any other type of stores can also be included. Further, merchant profile information includes merchant store name, store menu, list of items offered by the merchant, pictures of food, pictures of merchant store, categories of items, categories of food, merchants address, merchant store hours, and/or merchants phone number, although any other type of information associated with the merchant can also be included. The customer location 104(1)-104(n) may include a residential location, an office building, an apartment, although any other type of residence can also be included. Further, customer profile information in remote database 120 may include customer name, customers home address, pictures of customer, and/or customer phone number, although any other type of information associated with the merchant can also be included. The delivery transportation 108(1)-108(n) may include a car, bike, truck, bus, although any other type of delivery transportation can also be included. Further, driver profile information includes drivers name, drivers home address, pictures of driver, and/or drivers phone number, make and model of a delivery transportation the driver drives, although any other type of information associated with the driver can also be included.

In one aspect, integration server system 116 may include one or more computing devices, configured to perform one or more operations consistent with disclosed embodiments as described more fully below in relation to FIGS. 4-7. In one aspect, integration server system 116 may include one or more servers or server systems. Integration server system 116 may include one or more processors configured to execute software instructions stored in a memory or other storage device. The one or more processors may be configured to execute the stored software instructions to perform internet-related communication, online order-based processes, and receiving and propagating efficient search updates in real time. The one or more computing devices of integration server system 116 may be configured to modify and store customer profile information, merchant profile information and/or driver profile information. The one or more computing devices of integration server system 116 may also be configured to communicate with other components of system 100 to receive and propagate efficient search updates in real time. In some embodiments, integration server system 116 may provide one or more mobile applications, web-sites or online portals that are accessible by customer devices 102(1)-102(n), item delivery provider devices 106(1)-106(n), item service provider device 110(1)-110(n) over communication network 114. The disclosed embodiments are not limited to any particular configuration of integration server system 116.

Communication network 114 may comprise any type of computer networking arrangement configured to provide communications or exchange data, or both, between components of system 100. For example, communication network 114 may include any type of network (including infrastructure) that provides communications, exchanges information, and/or facilitates the exchange of information, such as the Internet, a private data network, a virtual private network using a public network, a LAN or WAN network, a Wi-Fi™ network, and/or other suitable connections that may enable information exchange among various components of system 100. Communication network 114 may also include a public switched telephone network ("PSTN") and/or a wireless cellular network. Communication network 114 may be a secured network or unsecured network. In some embodiments, one or more components of system 100 may communicate directly through a dedicated communication link(s).

Customer devices 102(1)-102(n), item delivery provider devices 106(1)-106(n), item service provider devices 110(1)-110(n) may be one or more computing devices configured to perform one or more operations consistent with the disclosed embodiments, as described more fully below in relation to FIG. 2. Customer devices 102(1)-102(n), item delivery provider devices 106(1)-106(n), item service provider devices 110(1)-110(n) may execute browser or related mobile display software that displays an online portal for placing online orders for delivery of items, receiving orders and delivering items that are ordered, on a display included in, or connected to, customer devices 102(1)-102(n). Customer devices 102(1)-102(n) may also store and execute other mobile applications that allow customers, merchants, and/or drivers to interact with an online portal provided by the integration server system 116.

It is to be understood that the configuration of the functional blocks of system 100 has been defined herein for convenience of description. The components and arrangement of the components included in system 100 may vary. For example, in some embodiments, system 100 may include other components that perform or assist in the performance of one or more processes consistent with disclosed methods. System 100 includes a number of components generally described as computing devices. Each of the computing devices may include any number of computing components particularly configured as a special purpose computing device to perform the functionality disclosed herein. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
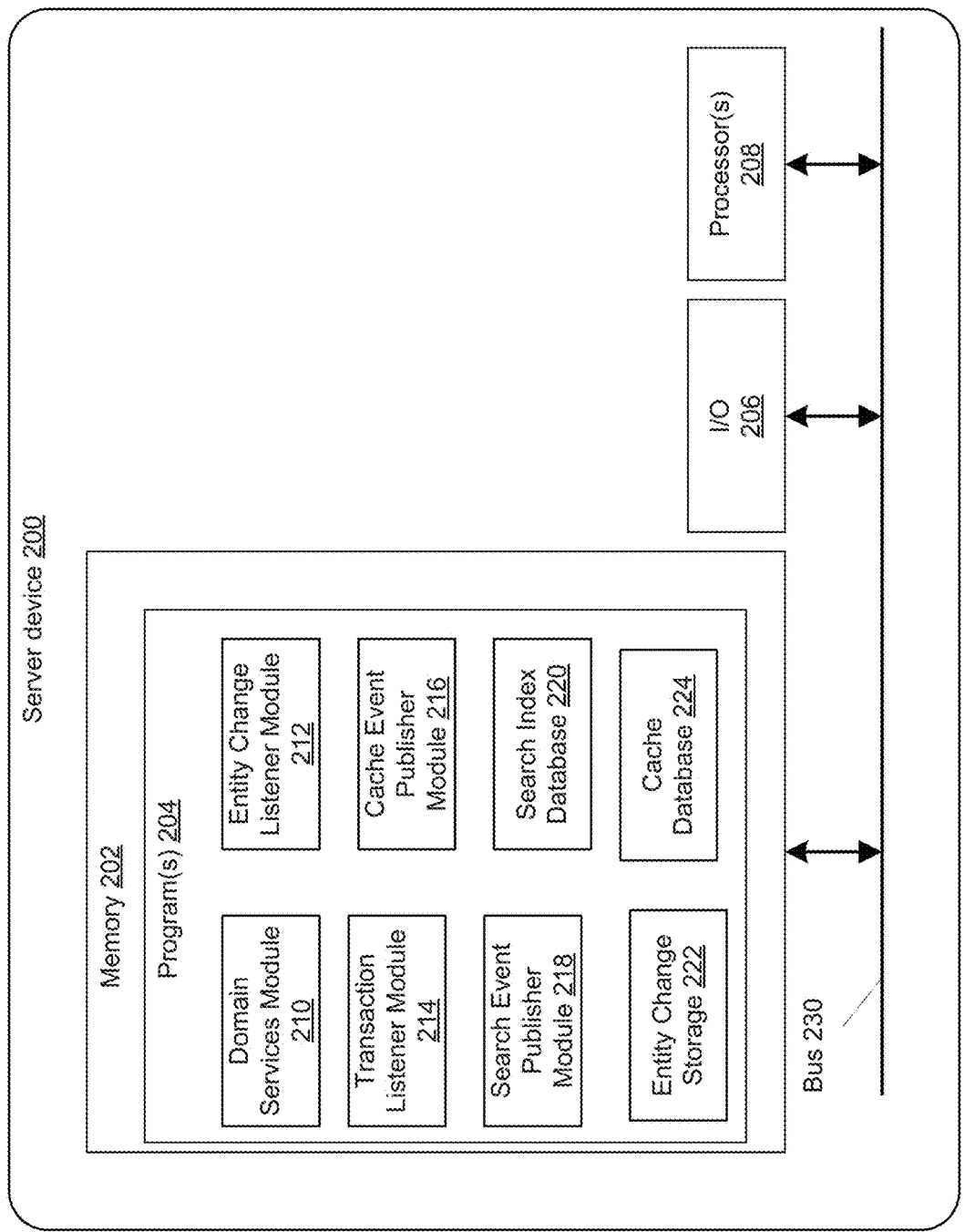
FIG. 2 is a block diagram of an exemplary server system, consistent with disclosed embodiments.

FIG. 2 shows an exemplary server device 200 consistent with the disclosed embodiments. Variations of exemplary server device 200 may constitute one or more components of integration server system 116. In one embodiment, server device 200 includes one or more memories 202, one or more I/O devices 206, and one or more processors 208. In some embodiments, server device 200 may be a part of integration server system 116. In some embodiments, server device 200 may take the form of a specially programmed server or computing system used by integration server system 116 to perform complete functions of integration server system 116. In some embodiments, server device 200 may be configured as an apparatus, embedded system, dedicated circuit, or the like based on the storage, execution, and/or implementation of software instructions that perform one or more operations consistent with the disclosed embodiments.

Memory 202 may include one or more storage devices configured to store instructions used by processor 208 to perform functions related to disclosed embodiments. For example, memory 202 may be configured with one or more software instructions, such as program(s) 204 that may perform one or more operations when executed by processor 208. The disclosed embodiments are not limited to separate programs or computers configured to perform dedicated tasks. For example, memory 202 may include a single program 204 that performs the functions of server device 200, or program 204 may comprise multiple programs. In certain embodiments, memory 202 may store sets of instructions or programs 204 for performing functions of integration server system 116. These sets of instructions may be executed by processor 208 to perform communication and/or processes consistent with disclosed embodiments.

In certain embodiments, when server device 200 constitutes one or more of the components of integration server system 116, memory 202 includes a domain services module 210, entity change listener module 212, transaction listener module 214, cache event publisher module 216, search event publisher module 218, search index database 220, entity change storage 222 and cache database 224, as described in detail below.

In other embodiments, each of the domain services module 210, entity change listener module 212, transaction listener module 214, cache event publisher module 216, search event publisher module 218, search index database 220, entity change storage 222 and cache database 224, may be implemented as separate and individual servers communicating with each other, remote database 120 and customer devices 102(1)-102(n), item delivery provider devices 106(1)-106(n), item service provider devices 110(1)-110(n) over communication network 114. In another example, search index database 220, entity change storage and cache database may be hosted at remote database 120.

Input/output (I/O) 206 may include various input/output devices, such as a keyboard, a mouse-type device, a gesture sensor, an action sensor, a physical button, switch, microphone, touchscreen panel, stylus, etc., that may be manipulated by customer devices 102(1)-102(n), item delivery provider device 106(1) and/or item service provider device 110(1)-110(n). I/O devices 206 may also include an audio output device. Exemplary communication modules of I/O devices 206 may include, for example, a short-range or near field wireless communication modem, a Wi-Fi™ communication modem, or a cellular communication modem. I/O devices 206 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in server device 200 to exchange information with integration server system 116, customer devices 102(1)-102(n) item delivery provider device 106(1), item service provider device 110(1)-110(n) or remote database 120 via communication network 114.

Processor 208 may include one or more known processing devices, such as a microprocessor from the Pentium™ or Xeon™ family manufactured by Intel™, or the Turion™ family manufactured by AMD™, for example. The disclosed embodiments are not limited to any type of processor(s) otherwise configured to meet the computing demands required of different components of system 100.

Figure 3:
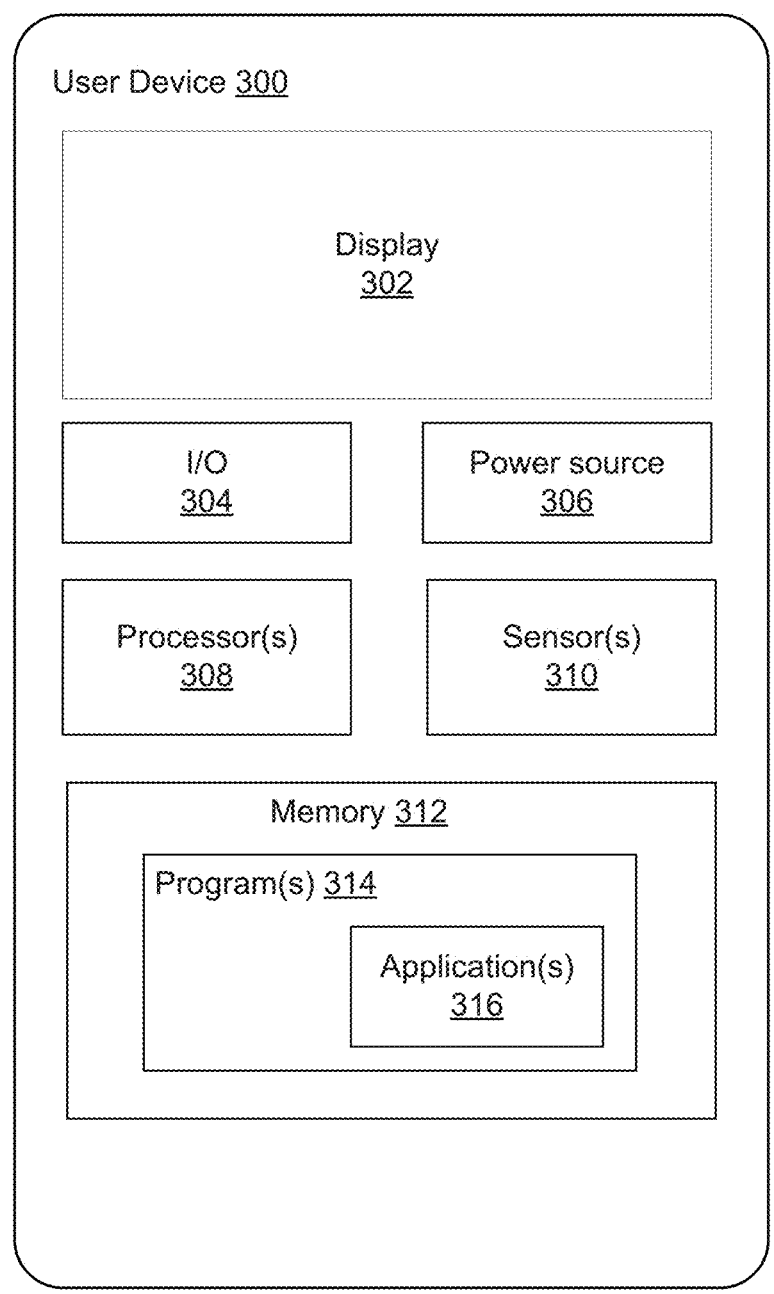
FIG. 3 is a block diagram of an exemplary user device, consistent with disclosed embodiments.

FIG. 3 shows an exemplary configuration of user device 300, consistent with disclosed embodiments. User device 300 of FIG. 3 represents an exemplary configuration of each of the customer devices 102(1)-102(n), the item delivery provider devices 106(1)-106(n) and item service provider devices 110(1)-110(n).

User device 300 may enable associated customers, drivers and merchants associated with customer devices 102(1)-102(n), the item delivery provider devices 106(1)-106(n) and item service provider devices 110(1)-110(n), respectively to, for example, perform remote interactions or mobile transactions with integration server system 116, or receive information from integration server system 116. In some embodiments, user device 300 may be a personal computing device. For example, user device 300 may be a smartphone, a laptop or notebook computer, a tablet, a multifunctional watch, a pair of multifunctional glasses, or any mobile or wearable device with computing ability, or any combination of these computers and/or affiliated components.

User device 300 includes one or more processors 308 configured to execute software instructions stored in memory, such as a memory 312. Memory 312 may store one or more software programs 314 that when executed by processor 308 perform known Internet-related communication, content display processes, and other interactive processes for customers, drivers and/or merchants. For instance, user device 300 may execute a browser or related mobile display software that generates and displays interfaces including content on a display device 302 included in, or in communication with, user device 300. User device 300 may be a mobile device that executes mobile device applications and/or mobile device communication software, included in programs 314, that allows user device 300 to communicate with integration server system 116 and other components via communication network 114, to generate and display content in interfaces via display device 302. The disclosed embodiments are not limited to any particular configuration of user device 300. User device 300 may include any arrangement of one or more computing devices configured to perform one or more operations consistent with disclosed embodiments.

User device 300 may be configured to store, in memory 312, one or more operating systems that perform known operating system functions when executed by processor 308. By way of example, the operating systems may include Microsoft Windows™, Unix™, Linux™, Android™, Apple™ Mac OS operating systems, iOS, Chrome OS, or other types of operating systems. Accordingly, disclosed embodiments may operate and function with computer systems running any type of operating system. User device 300 may also include communication software stored in memory 312 that, when executed by processor 308, provides communications with communication network 114, such as Web browser software, tablet or smart handheld device networking software, etc.

Display device 302 may include, for example, a liquid crystal displays (LCD), a light emitting diode screen (LED), an organic light emitting diode screen (OLED), a touch screen, and other known display devices. Display device 302 may display various information to customers, drivers and merchants. For example, display device 302 may display an interactive interface enabling customers, drivers and merchants to operate user device 300 to perform certain aspects of the disclosed methods. Display device 302 may display touchable or selectable options for customers, drivers and merchants to select and may receive customer selection of options through a touch screen.

User device 300 includes I/O devices 304 that allows to send and receive information or interact with customers, drivers and merchants or another device. For example, I/O devices 304 may include various input/output devices, such as a keyboard, a mouse-type device, a gesture sensor, an action sensor, a physical button, switch, microphone, touchscreen panel, stylus, etc., that may be manipulated by customers, drivers and merchants to input information using user device 300. I/O devices 304 may also include an audio output device, such as a speaker configured to provide sound and audio feedback to customers, drivers and merchants operating user device 300. In some embodiments, I/O devices 304 may include a light emitting component, such as a LED or other component capable of providing a visible signal to customers, drivers and merchants. I/O devices 304 may also include haptic output devices, to provide haptic feedback to customers, drivers and merchants. I/O devices 304 may also include one or more communication modules (not shown) for sending and receiving information from other components in system 100 by, for example, establishing wired or wireless connectivity between user device 300 and communication network 114. I/O devices 304 may include radio frequency, infrared, or other near-field communication interfaces, for communicating with other devices associated with communication network 114. Exemplary communication modules of I/O devices 304 may include, for example, a short-range or near field wireless communication modem, a Wi-Fi™ communication modem, or a cellular communication modem. I/O devices 304 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in user device 300 to exchange information with integration server system 116 or remote database 120 via communication network 114.

As described above, user device 300 may be a device that executes mobile applications for performing operations consistent with disclosed embodiments. Thus, in some embodiments, programs 314 stored on user device 300 may include one or more software applications 316 installed thereon, that enable user device 300 to communicate with integration server system 116 via communication network 114 and perform aspects of the disclosed methods. For example, user device 300 may connect to integration server system 116 by using browser software to access and receive information or perform other operations associated with an internet service provider.

According to an exemplary embodiment, software applications 316 associated with integration server system 116 may be installed on user device 300, as shown in FIG. 3. For example, integration server system 116 may receive a request from customer device 102(1) to download one or more software applications 316 to user customer device 102(1). In one embodiment, integration server system 116 may receive the request from a customer associated with customer device 102(1), using a web browser application installed on customer device 102(1) respectively. In another embodiment, integration server system 116 may receive the request to download one or more software applications 316 associated with integration server system 116 onto customer device 102(1) from a webpage or another portal associated with integration server system 116 accessed via, e.g., customer device 102(1). In this embodiment, integration server system 116 may store software instructions corresponding to one or more software applications 316 in remote database 120. For responding to the download request, integration server system 116 may receive additional information from customer device 102(1) regarding the particular device specifications of customer device 102(1) to enable customer device 102(1) to download software instructions corresponding to the particular specifications. Alternatively, integration server system 116 may push a download request link to customer device 102(1) or transmit software code corresponding to one or more software applications 316 directly to customer device 102(1) in, for example, an e-mail, a text or short message service (SMS) message, a prompt through an app, or other suitable method. Customer device 102(1) may receive the software code related to one or more software applications 316, such as via communication network 114, to download and install the software code. Similarly, in another example, integration server system 116 may receive a request from a deriver associated with item delivery provider device 106(1) to download one or more software applications 316 onto the item delivery provider device 106(1). Further, similarly, in another example, integration server system 116 may receive a request from a merchant associated with item service provider device 110(1) to download one or more software applications 316 onto the item service provider device 110(1).

Figure 4:
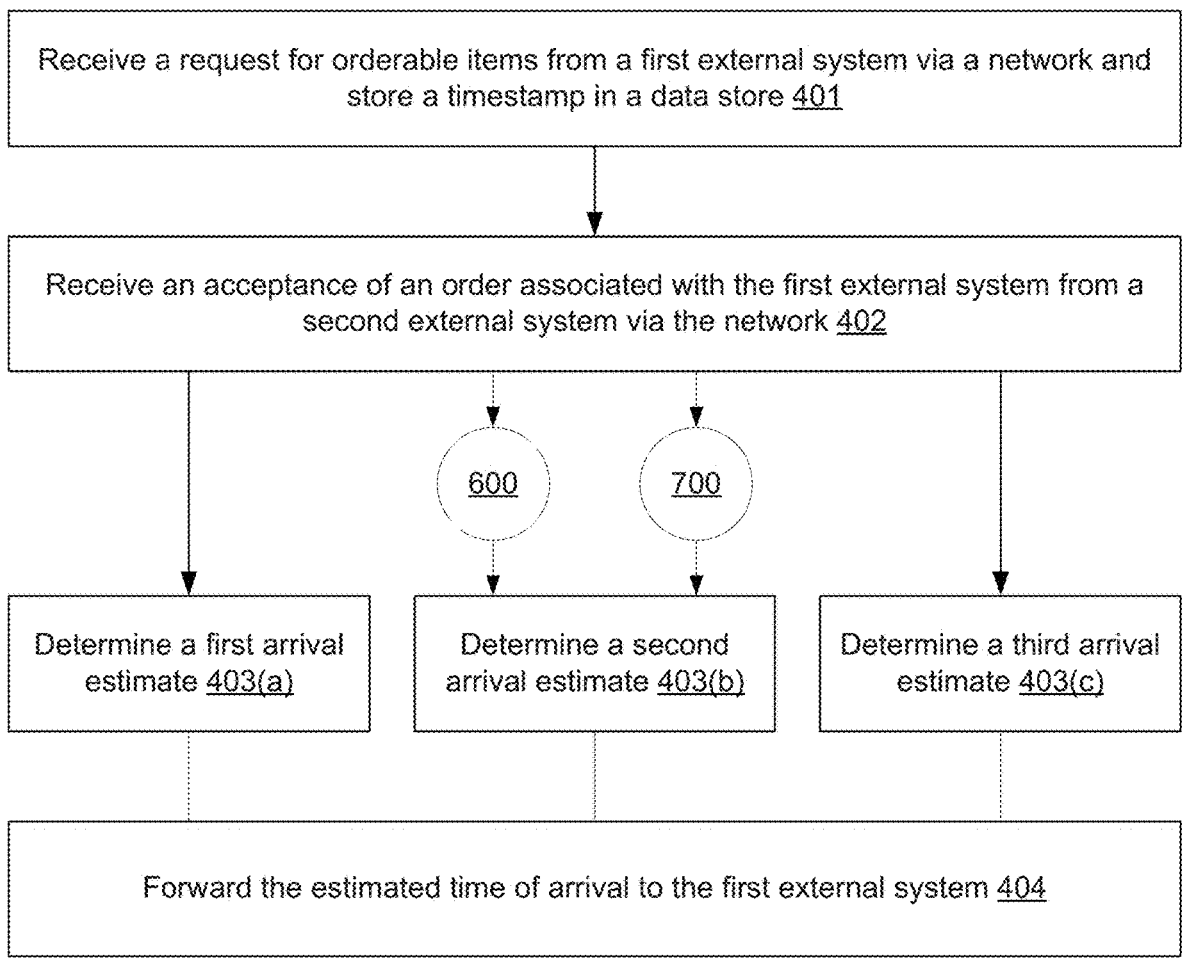
FIG. 4 is a flowchart of an exemplary computerized process for intelligently estimating an arrival time of at least one orderable item, consistent with disclosed embodiments.

FIG. 4 is a flowchart of an exemplary computerized process 400 for intelligently estimating an arrival time of at least one orderable item. In preferred embodiments, process 400 may be executed by one or more components of integration server system 116 and/or server device 200 (e.g., processor(s) 208). Thus, by way of example, process 400 is described as being executed by processor 208. However, process 400 or a portion thereof may be performed by the system 100 as a whole or by any component of system 100 capable of performing at least a portion of the process (e.g., integration server system 116, server device 200, etc.).

Process 400 begins at step 401. At step 401, processor 208 may receive, a request for at least one orderable item from a first external system via a network and store a timestamp in a data store. The first external system may, for example, be a computerized system associated with a customer that is utilizing system 100 to order an item from a merchant. The computerized system may be a device, such as customer device 102(1)-102(n), which may be a computerized device as described with reference to FIG. 3 (e.g., user device 300). The customer may use application 316 installed onto the user device 300 to order the at least one orderable item from a merchant. For example, the customer may place an order request including one or more food items from a restaurant associated with system 100. Once the customer's order is submitted through application 316, the user device may send a communication to integration server system 116 indicating that the customer has requested delivery of the at least one orderable item through communication network 114. The request may also be sent to item service provider device 110(1)-110(n) for confirmation or acceptance of the order. Upon receipt of this request, processor 208 may record the time at which the request was received and store the recorded time as a time stamp within a data store. The data store may, for example, be one or more of any type of data storage component or device associated with remote database 120.

After step 401 has been completed, process 400 may then continue to step 402. At step 402, processor 208 may receive an acceptance of the order associated with the first external system from a second external system via the network. The second external system may be a device, such as item service provider device 102(1)-102(n), which may be a computerized device as described with reference to FIG. 3 (e.g., user device 300). As discussed above, in response to receiving the order request from customer device 102(1)-102(n), the merchant may determine that it can fulfill the particular order requested and input a confirmation of acceptance into item service provider device 110(1)-110(n). Inputting a confirmation of acceptance may, for example, include inputting the confirmation through an application 316 of a user device 300. The confirmation may then be sent through communication network 114 to integration server system 116 where it may be received by processor 208.

After step 402 has been completed, process 400 may then continue to one of steps 403(a), 403(b), or 403(c). At steps 403(a), 403(b), or 403(c), processor 208 may determine a first arrival estimate, a second arrival estimate, and a third arrival estimate, respectively. At step 403(a), the first arrival estimate may be based on a first estimated travel time between locations associated with the first external system and the second external system based on a first estimated travel time between locations associated with the first external system and the second external system and a determined preparation time for the at least one item (e.g., a total of an estimated travel time between a merchant location and a customer location and an estimated preparation time of the at least one item). The determined preparation time may, in some embodiments, be calculated using previously recorded preparation times and associated metadata, which is discussed in further detail below with reference to FIG. 5.

In some embodiments, the first arrival estimate may be based on the first estimated travel time between locations associated with the first external system and the second external system (e.g., an estimated travel time between a merchant location and a customer location) and a second estimated travel time between locations associated with the second external system and at least one third external system. The at least one third external system may include one or more devices, such as item delivery provider device 106(1)-106(n) associated with vehicle 108(1)-108(n), which may be a computerized device as described with reference to FIG. 3 (e.g., user device 300). In other words, the second estimated travel time may be an estimate of the travel time between potential delivery workers and the merchant location. For example, potential delivery workers may be one or more unassigned delivery workers that are nearest to the merchant location.

In some embodiments, the estimated travel time between locations may be calculated by determining a straight-line distance between two locations, selecting a constant speed, and determining the estimated travel time along the straight-line distance at the selected constant speed. The straight-line distance may be a numerical value representing the physical distance between two locations (e.g., locations associated with the first external system and the second external system). In some embodiments, this physical distance may also be a distance corresponding to the shortest travel distance between two locations along roads, or a determined distance corresponding to the shortest travel time between two locations along roads. Once a straight-line distance between two locations is determined, processor 208 may use a selected constant speed to calculate the estimated travel time. The selected constant speed distance may, in some embodiments, be a constant number determined to be an average travel speed when delivering goods, and may also be based on historical data collected by integration server system 116 from past delivery work (e.g., from item delivery provider device 106(1)-106(n)). In some embodiments, the selected speed may vary on individually for each order and may be based on other factors such as time of day, traffic, type of vehicle, weather conditions, etc.

In preferred embodiments, an estimated arrival time will not be before the actual delivery time, as it could negatively impact customer satisfaction. Thus, in some embodiments, processor 208 may determine which one of the determined preparation time and the second estimated travel time is greater, and use the greater value to determine the first arrival estimate. For example, processor 208 may determine the first arrival estimate using the variables describe above in the following algorithm:

$$ETA_1 = \max(T_{prep}, T_2) + T_1 \pm T_{buffer} \quad (1)$$

Where $ETA_1$ is the first arrival estimate, $T_{prep}$ is the determined preparation time, $T_1$ is the first estimated travel time (i.e., an estimated travel time between a merchant location and a customer location), $T_2$ is the second estimated travel time (i.e., an estimated travel time between potential delivery workers and the merchant location), and $T_{buffer}$ is a buffer time. In some embodiments, the buffer time may be a predetermined amount of time used to compensate for errors in the delivery process. The errors may be attributed due to any number of factors such as traffic, lack of resources at the merchant, etc. The buffer time may be a fixed amount of time (e.g., 10 minutes) or a fixed percentage of the calculated arrival estimate (e.g., 10% of the calculated arrival estimate), or may be calculated individually for each order based on any number of factors such as time and date of order, item ordered, average variance in preparation time and/or travel time, etc. In some embodiments, processor 208 may calculate the first arrival estimate upon receiving the acceptance of the order from the second external system and forward the first arrival estimate to the first external system at step 404, concluding process 400.

At step 403(b) of process 400, processor 208 may determine a second delivery estimate. The second delivery estimate may, for example, be based on the first estimated travel time and one of the determined preparation time for the at least one item or a third estimated travel time. The second delivery estimate may, in some embodiments, be calculated upon receiving an acceptance to fulfill the order from the third external system during one or both the processes 600 and 700 for assigning a delivery worker to a specific order, which will be discussed in detail below with reference to FIGS. 6 and 7. In contrast to the calculation of the first arrival estimate, which bases the calculation on an estimated travel time between locations associated with the second external system and a plurality of third external systems that may potentially fulfill the order, the second arrival estimate may be based on a third estimated travel time between locations associated with the second external system and a specifically assigned third external system. In other words, the second arrival time may be based on an estimated travel time between an assigned delivery worker's location and the merchant location. Thus, as there is no speculation on which third external system will be associated with the fulfillment of the order, the second delivery estimate may be calculated with a higher degree of certainty. For example, processor 208 may determine the second arrival estimate using the variables describe above in the following algorithm:

$$ETA_2 = \max(T_{prep}, T_3) + T_1 \pm T_{buffer} \quad (2)$$

Where $ETA_2$ is the second arrival estimate, $T_{prep}$ is the determined preparation time, $T_1$ is the first estimated travel time, $T_3$ is the third estimated travel time (i.e., an estimated travel time between an assigned delivery worker's location and the merchant location), and $T_{buffer}$ is a buffer time. In some embodiments, processor 208 may calculate the second arrival estimate upon receiving the acceptance of the order from the second external system and forward the first arrival estimate to the first external system at step 404, concluding process 400.

At step 403(c) of process 400, processor 208 may determine a third arrival estimate. The third arrival estimate may, for example, be based on the first estimated travel time. The third arrival estimate may, in some embodiments, be calculated upon determining that the delivery worker associated with the third external system has retrieved the order from the merchant associated with the second external system. In contrast to the calculation of the first and second arrival estimates, which bases the calculation on an estimated travel time between locations associated with the second external system and at least one third external system, the third arrival estimate may be based only on the first estimated travel time between locations associated with the first external system and the second (i.e., estimated travel time between the merchant and the customer). Thus, as there is no estimation on preparation time or travel time between the delivery worker and the merchant, the third arrival estimate may be calculated with a higher degree of certainty than the previous estimates. For example, processor 208 may determine the third arrival estimate using the variables describe above in the following algorithm:

$$ETA_3 = T_1 + T_{buffer} \quad (3)$$

Where $ETA_3$ is the third arrival estimate, $T_1$ is the first estimated travel time, $T_3$ is the third estimated travel time, and $T_{buffer}$ is a buffer time. In some embodiments, processor 208 may calculate the third arrival estimate upon determining that the order has been retrieved and forward the first arrival estimate to the first external system at step 404, concluding process 400.

Figure 5:
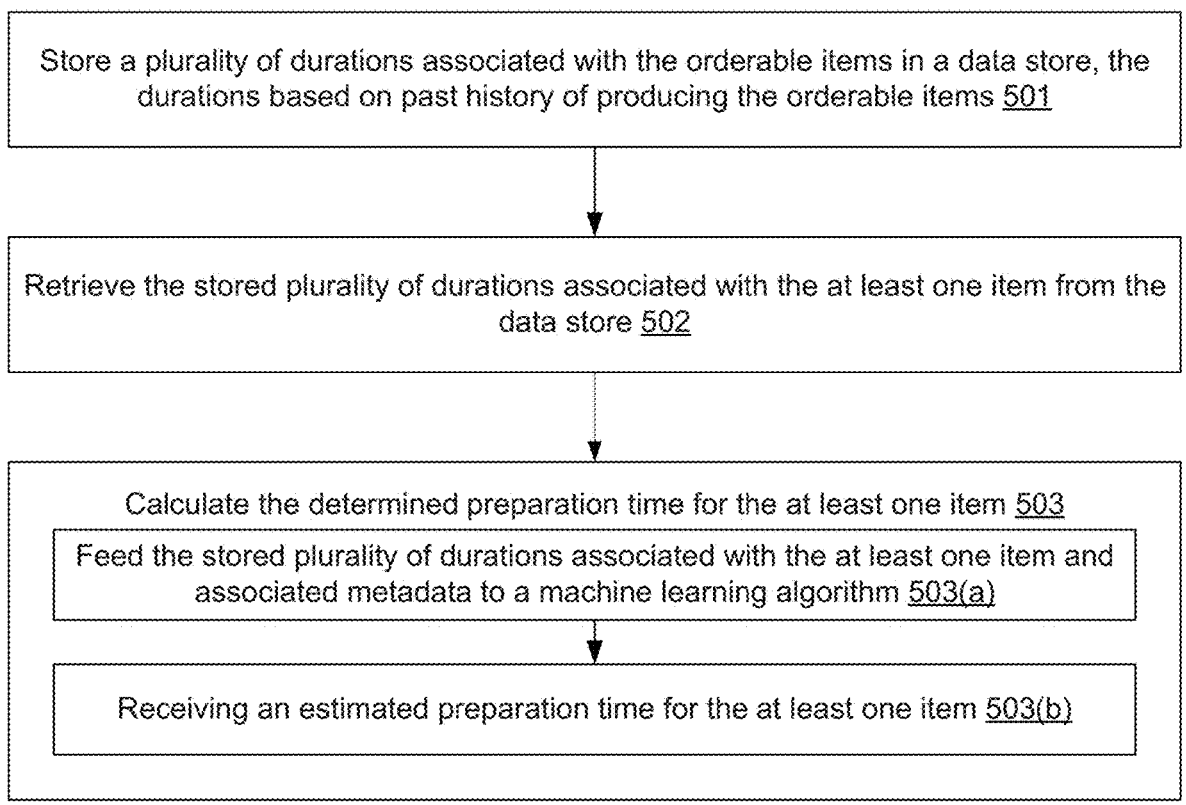
FIG. 5 is a flowchart of an exemplary computerized process for calculating the estimated preparation time of at least one orderable item, consistent with disclosed embodiments.

FIG. 5 is a flowchart of an exemplary computerized process 500 for calculating the estimated preparation time of at least one orderable item. In some embodiments, the estimated arrival times may be based at least in part on a determined preparation time for the at least one item. For example, some merchants may not have goods readily available upon customer order and must prepare the at least one item before the delivery worker picks it up from the merchant (e.g., restaurants). Process 500 may begin at step 501, where processor 208 may store a plurality of durations based on past history of producing the orderable items in a data store (e.g., data storage associate with external database 120). The plurality of durations, for example, may be data points representing the amount of time a restaurant takes to prepare one or more of the orderable items on their menu. These durations may be recorded, for example, on a per item basis by the merchant through an application on item service provider device 110(1)-110(n) (e.g., application 316) and communicated to integration server system 116, where processor 208 may then store the durations in a data store.

After step 501 is completed, process 500 may continue to step 502. At step 502, processor 208 may retrieve the stored plurality of durations associated with the at least one item from the data store. Once the stored plurality of durations has been retrieved, processor may use the plurality of durations associated with the at least one item to calculate the determined preparation time for the at least one item. Calculating the determined preparation time, for example, might include averaging the stored plurality of durations to determine an average preparation time for the at least one item.

In some embodiments, however, calculating the determined preparation time for the at least one item may include feeding the stored plurality of durations associated with the at least one and associated metadata to a machine learning algorithm. The associated metadata may include other data points corresponding to the order that have also been stored in the data store in addition to the duration time of the plurality of stored orders. For example, this metadata may include specific customization options elected at the time of the order (e.g., additional toppings), time and/or day of the order, resources available at the restaurant during the time of order, or and other factors that may influence the preparation time of the at least one ordered item. The machine learning algorithm may use the previously stored durations and associated metadata to generate a predictive model that will produce an estimated preparation time for at least one ordered item of a specified order based on the stored durations and associated metadata.

Figure 6:
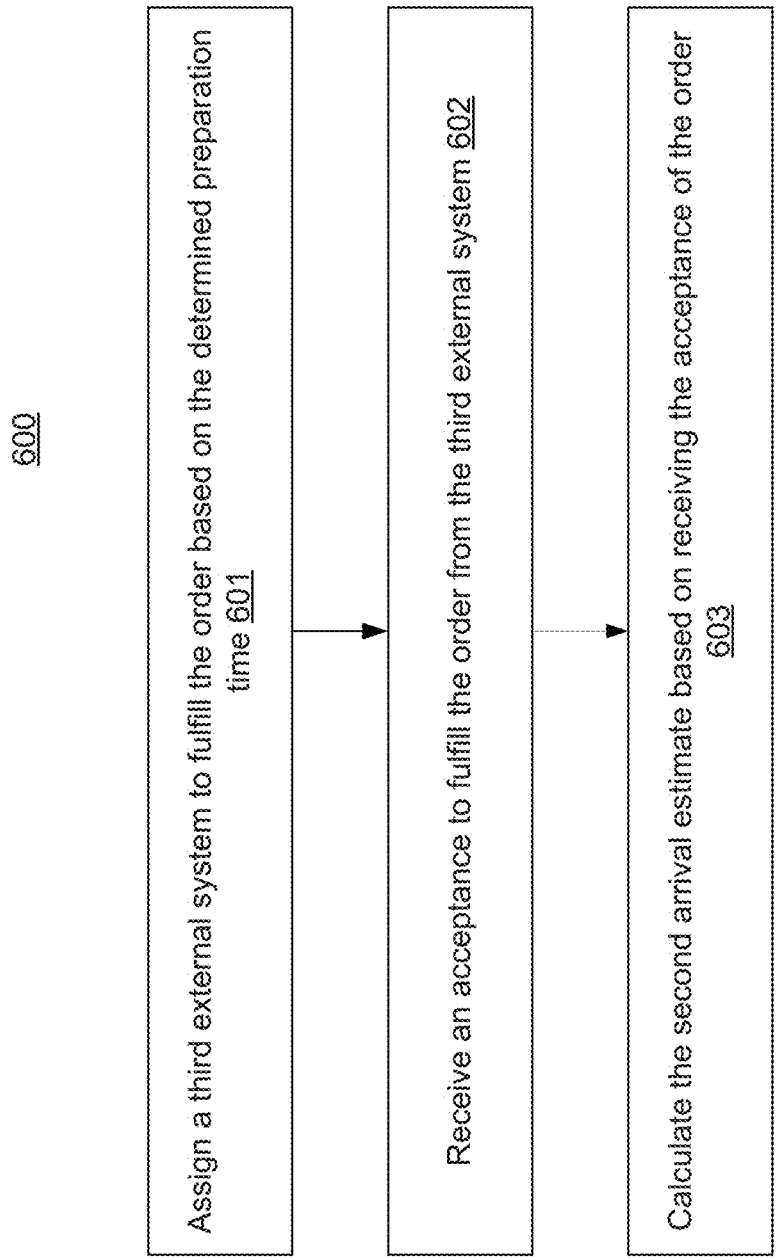
FIG. 6 is a flowchart of an exemplary computerized process for assigning a delivery worker to fulfill a specific order, consistent with disclosed embodiments.

FIG. 6 is a flowchart on of exemplary computerized process 600 for assigning a delivery worker to fulfill a specific order. Process 600 begins at step 601, where processor 208 may assign a third external system (e.g., item delivery provider device 106(1)-106(n)) to fulfill the order based on the determined preparation time (e.g., the determined preparation time produced from process 500). For example, processor may determine that the estimated travel time between the third external system (e.g., the delivery worker) and the second external system (e.g., the merchant and/or restaurant) is similar to the determined preparation time, and assign the third external system to fulfill the order based on the similarity. For example, processor 208 may determine the preparation time of an item as well as a plurality of travel times between a plurality of delivery workers and the merchant. In order to prevent delay in delivery, processor may assign a delivery worker to the order so that they arrive at approximately the same time as the item's preparation is complete. Assignment might include sending a notification to a third external system (e.g., e.g., item delivery provider device 106(1)-106(n)) requesting a response indicating whether the delivery worker can fulfill the order. Assignment of a third external system to fulfill an order is discussed in further detail below with reference to FIG. 7.

After step 601 has been completed, process 600 may continue to step 602 where processor 208 may receive an acceptance to fulfill the order from the third external system. This may occur, for example, when integration server system 116 sends a notification upon assignment to the third external system requesting confirmation that the third external system can fulfill the order. The notification may be sent through communication network 114 and may appear on item delivery provider device 106(1)-106(n) through application 316. The delivery worker may then use application 316 to accept the order, indicating that they will fulfill the order, which may then be sent to integration server system 116. At this point, processor 208 may receive this acceptance and process 600. Process 600 may then conclude at step 603, where processor 208 calculates the second arrival estimate based on receiving the acceptance of the order.

FIG. 7 is a flowchart of another exemplary computerized process 700 for assigning a delivery worker to a specific order. Process 700 may begin at step 701, where a location of the third external system is determined based on signals transmitted by the third external system. For example, the third external system may be connected to a global positioning system (GPS) that determines and communicates the location and/or coordinates of the third external system. The GPS may be associated with system 100 or may be associated with a third-party service provider. Using the GPS system, the third external system may send signals indicating its location and/or coordinates to integration server system 116 through communication network 114.

After step 701 is completed, process 700 may continue to step 702, where processor 208 may determine that the third external system (i.e., the delivery worker) will arrive at the location associated with the second external system (i.e., the merchant) before the determined preparation time has elapsed. In preferred embodiments, the delivery worker will not arrive at the merchant a substantial amount of time before the at least one ordered item is prepared, as the time spent by the delivery worker constitutes wasted time that would ideally be spent travelling between customers and merchants. Thus, to prevent waste, process 700 may continue to step 703 where processor 208 may delay the assignment of the order to the third external system for a delay period. The delay period may, for example, be a fixed amount of time (e.g., 1 minute) or a fixed percentage of the preparation time (e.g., 10%). In some embodiments, however, processor 208 may be configured to continuously execute the assignment process, and the delay period may be the period time between the time that the order is placed and the time that processor 208 determines that a delivery worker will arrive at approximately the same time that preparation for the at least concludes and assigns fulfillment of the order to the delivery worker accordingly. Once the delay period has elapsed, process 700 may continue to step 704 where processor 208 may assign the order to the third external system, concluding process 700.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for multi-point destination arrival time analysis, the system comprising:
    a memory storing instructions; and
    at least one processor configured to execute the instructions to:
        receive, from a first external system via a network, a request for at least one orderable item, and store a timestamp in a data store;
        receive, from a second external system via the network, an acceptance of an order associated with the first external system, the order comprising at least one item;
        determine a first arrival estimate based on a first estimated travel time between locations associated with the first external system and the second external system, and the greater of:
            a determined preparation time for the at least one item, and
            a second estimated travel time between locations associated with the second external system and a plurality of third external systems;
        determine a second arrival estimate based on the first estimated travel time, and the greater of:
            the determined preparation time for the at least one item, and
            a third estimated travel time between locations associated with the second external system and an assigned third external system;
        determine a third arrival estimate based on the first estimated travel time; and
        forward, upon their determination, the first, second, and third arrival estimates to the first external system.

2. The system of claim 1, wherein the instructions further cause the processor to:
    store a plurality of durations associated with the orderable items in a data store, the durations based on past history of producing the orderable items;
    calculate, based on the stored plurality of durations, the determined preparation time for the at least one item.

3. The system of claim 2, wherein calculating the determined preparation time further comprises:
    retrieving, from the data store, the stored plurality of durations associated with the at least one item;
    feeding the stored plurality of durations associated with the at least one item and associated metadata to a machine learning algorithm;
    receiving an estimated preparation time for the at least one item.

4. The system of claim 1, wherein the instructions further cause the processor to:
    assign, based on the determined preparation time, a third external system to fulfill the order;

receive, from the third external system, an acceptance to fulfill the order.

5. The system of claim 4, wherein the instructions further cause the processor to:
 calculate the first arrival estimate based on receiving the acceptance of the order;
 calculate the second arrival estimate based on receiving the acceptance to fulfill the order; or
 calculate the third arrival estimate based on determining that the order has been retrieved.

6. The system of claim 1, wherein the instructions further cause the processor to:
 determine, based on signals transmitted by the third external system, a location of the third external system;
 determine, based on the determined location, that the third external system will arrive at the location associated with the second external system before the determined preparation time has elapsed;
 delay assignment of the order to the third external system; and
 assign the order to the third external system at the conclusion of the delay period.

7. The system of claim 1, wherein at least one of the first, second, or third arrival estimates comprise a buffer.

8. The system of claim 1, wherein estimated travel time between locations is calculated by:
 determining a straight-line distance between two locations;
 selecting a constant speed;
 determining the estimated travel time along the straight-line distance at the selected constant speed.

9. The system of claim 1, wherein:
 the first external system comprises a customer device for requesting delivery;
 the second external system comprises a merchant device; and
 the third external system comprises a mobile device for use by a delivery worker.

10. A computer-implemented method for multi-point destination arrival time analysis, the method comprising:
 receiving, from a first external system via a network, a request for at least one orderable item, and store a timestamp in a data store;
 receiving, from a second external system via the network, an acceptance of an order associated with the first external system, the order comprising at least one item;
 determining a first arrival estimate based on a first estimated travel time between locations associated with the first external system and the second external system, and the greater of:
  a determined preparation time for the at least one item, and
  a second estimated travel time between locations associated with the second external system and a plurality of third external systems;
 determining a second arrival estimate based on the first estimated travel time, and the greater of:
  the determined preparation time for the at least one item, and
  a third estimated travel time between locations associated with the second external system and an assigned third external system;
 determining a third arrival estimate based on the first estimated travel time; and
 forwarding, upon their determination, the first, second, and third arrival estimates to the first external system.

11. The method of claim 10, further comprising:
 storing a plurality of durations associated with the orderable items in a data store, the durations based on past history of producing the orderable items;
 calculating, based on the stored plurality of durations, the determined preparation time for the at least one item.

12. The method of claim 11, wherein calculating the determined preparation time further comprises:
 retrieving, from the data store, the stored plurality of durations associated with one item;
 feeding the stored plurality of durations associated with one item and associated metadata to a machine learning algorithm;
 receiving an estimated preparation time for the one item.

13. The method of claim 10, further comprising:
 assigning, based on the determined preparation time, a third external system to fulfill the order;
 receiving, from the third external system, an acceptance to fulfill the order.

14. The method of claim 13, further comprising:
 calculating the first arrival estimate based on receiving the acceptance of the order;
 calculating the second arrival estimate based on receiving the acceptance to fulfill the order; or
 calculating the third arrival estimate based on determining that the order has been retrieved.

15. The method of claim 10, further comprising:
 determining, based on signals transmitted by the third external system, a location of the third external system;
 determining, based on the determined location, that the third external system will arrive at the location associated with the second external system before the determined preparation time has elapsed;
 delaying assignment of the order to the third external system; and
 assigning the order to the third external system at the conclusion of the delay period.

16. The method of claim 10, wherein at least one of the first, second, or third arrival estimates comprise a buffer.

17. The method of claim 10, wherein estimated travel time between locations is calculated by:
 determining a straight-line distance between two locations;
 selecting a constant speed;
 determining the estimated travel time along the straight-line distance at the selected constant speed.

18. The method of claim 10, wherein:
 the first external system comprises a customer device for requesting delivery;
 the second external system comprises a merchant device; and
 the third external system comprises a mobile device for use by a delivery worker.

19. A computer-implemented system for multi-point destination arrival time analysis, the system comprising:
 a memory storing instructions; and
 at least one processor configured to execute the instructions to:
  receive, from a customer device for requesting delivery via a network, a request for at least one orderable item, and store a timestamp in a data store;
  receive, from a merchant device via the network, an acceptance of an order associated with the customer device, the order comprising at least one item, and in response thereto;

determine a first arrival estimate based on a first estimated travel time between locations associated with the customer device and the merchant device, and the greater of:
- a determined preparation time for the at least one item, and
- an second estimated travel time between locations associated with the merchant device and a plurality of delivery devices for use by delivery workers; and forward the first arrival estimate to the customer device;

receive, from an assigned delivery device, an acceptance to fulfill the order, and in response thereto;

determine a second arrival estimate based on the first estimated travel time, and the greater of:
- the determined preparation time for the at least one item, and
- a third estimated travel time between locations associated with the merchant device and an assigned delivery device; and forward the second arrival estimate to the customer device;

receive, from a merchant device or an assigned delivery device, confirmation that the order has been retrieved, and in response thereto;

determine a third arrival estimate based on the first estimated travel time; and forward the third arrival estimate to the customer device.

20. The system of claim 19, further comprising:

storing a plurality of durations associated with the orderable items in a data store, the durations based on past history of producing the orderable items;

retrieving, from the data store, the stored plurality of durations associated with one item;

feeding the stored plurality of durations associated with one item and associated metadata to a machine learning algorithm;

receiving an estimated preparation time for the one item.

* * * * *